SNAP SWITCH AND THERMORESPONSIVE ACTUATOR

Filed Feb. 15, 1967 5 Sheets-Sheet 1

INVENTOR.
JOHN W. HUFFMAN
BY
Harry O. Ernsberger
ATTORNEY

Sept. 15, 1970 J. W. HUFFMAN 3,529,105

SNAP SWITCH AND THERMORESPONSIVE ACTUATOR

Filed Feb. 15, 1967 5 Sheets-Sheet 2

INVENTOR.
JOHN W. HUFFMAN
BY
Harry O. Ernsberger
ATTORNEY

INVENTOR.
JOHN W. HUFFMAN
BY
Harry O. Ernsberger
ATTORNEY

SNAP SWITCH AND THERMORESPONSIVE ACTUATOR

Filed Feb. 15, 1967 5 Sheets-Sheet 4

INVENTOR.
JOHN W. HUFFMAN
BY
Harry O. Ernsberger
ATTORNEY

SNAP SWITCH AND THERMORESPONSIVE ACTUATOR

Filed Feb. 15, 1967

INVENTOR.
JOHN W. HUFFMAN
BY
Harry O. Ernsberger
ATTORNEY

United States Patent Office 3,529,105
Patented Sept. 15, 1970

3,529,105

SNAP SWITCH AND THERMORESPONSIVE ACTUATOR

John W. Huffman, Mansfield, Ohio, assignor to Emerson Electric Co., St. Louis, Mo., a corporation of Missouri
Filed Feb. 15, 1967, Ser. No. 616,394
Int. Cl. H01h *21/04, 21/24, 21/44*
U.S. Cl. 200—67 2 Claims

ABSTRACT OF THE DISCLOSURE

A switch mechanism of a miniature or microswitch type embodying snap action for engaging and disengaging relatively movable contacts and wherein the switch mechanism is of compact construction contained within a housing of insulating material. The invention includes thermoresponsive devices arranged to actuate a component of the switch mechanism under the influence of temperature variations, the invention including means for adjusting the relative position of an actuating member with respect to a thermoresponsive means.

Various types of microswitch or miniature switch have been heretofore used for making and breaking a circuit by actuation of a movable component of the switch mechanism. Switches of this character have included a resilient contact carrying member normally flexed into contact engaging position and which is flexed to disengage a movable contact from a second contact without snap action.

By reason of relatively slow flexing movement of the switch member in switches of this type, there is a tendency for arcing to occur between the contacts during their engagement and disengagement, a condition fostering excessive wear and sticking of the contacts.

The present invention embraces a microswitch or miniature switch embodying a flexible switch arm or member carrying a contact cooperable with a second contact in combination with actuable means for effecting movement of the flexible arm or member by snap action whereby arcing at the contacts is substantially eliminated or greatly reduced.

Another object of the invention is the provision of a microswitch wherein the components of the switch mechanism are of compact construction and enclosed or supported within an insulating housing of small dimension and wherein a resilient means engages a flexible contact carrying member in a manner to effect engagement and disengagement of the contacts by snap action, the switch mechanism including means extending exteriorly of the housing for actuating the resilient means providing the snap action.

Another object of the invention resides in a microswitch construction contained within a housing fashioned of two components of insulating material and wherein the switch mechanism within the housing is arranged for snap action of a flexible contact carrying member, the housing components being secured together in a manner to maintain the components of the switch mechanism in assembled relation.

Another object of the invention resides in a microswitch construction having an actuable member associated with a thermoresponsive medium arranged whereby relative movement of the thermoresponsive medium is transmitted to the actuable member to control engagement and disengagement of switch contacts within the switch housing under the influence of ambient temperature variations.

Another object of the invention is the combination of a microswitch construction associated with a thermoresponsive medium whereby relative movement of the thermoresponsive medium is transferred to the switch mechanism through a member, the member being adjustable by manual means for controlling the influence of the thermoresponsive means on the switch mechanism.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figures 1, 2, 3, 4, 5, 6:
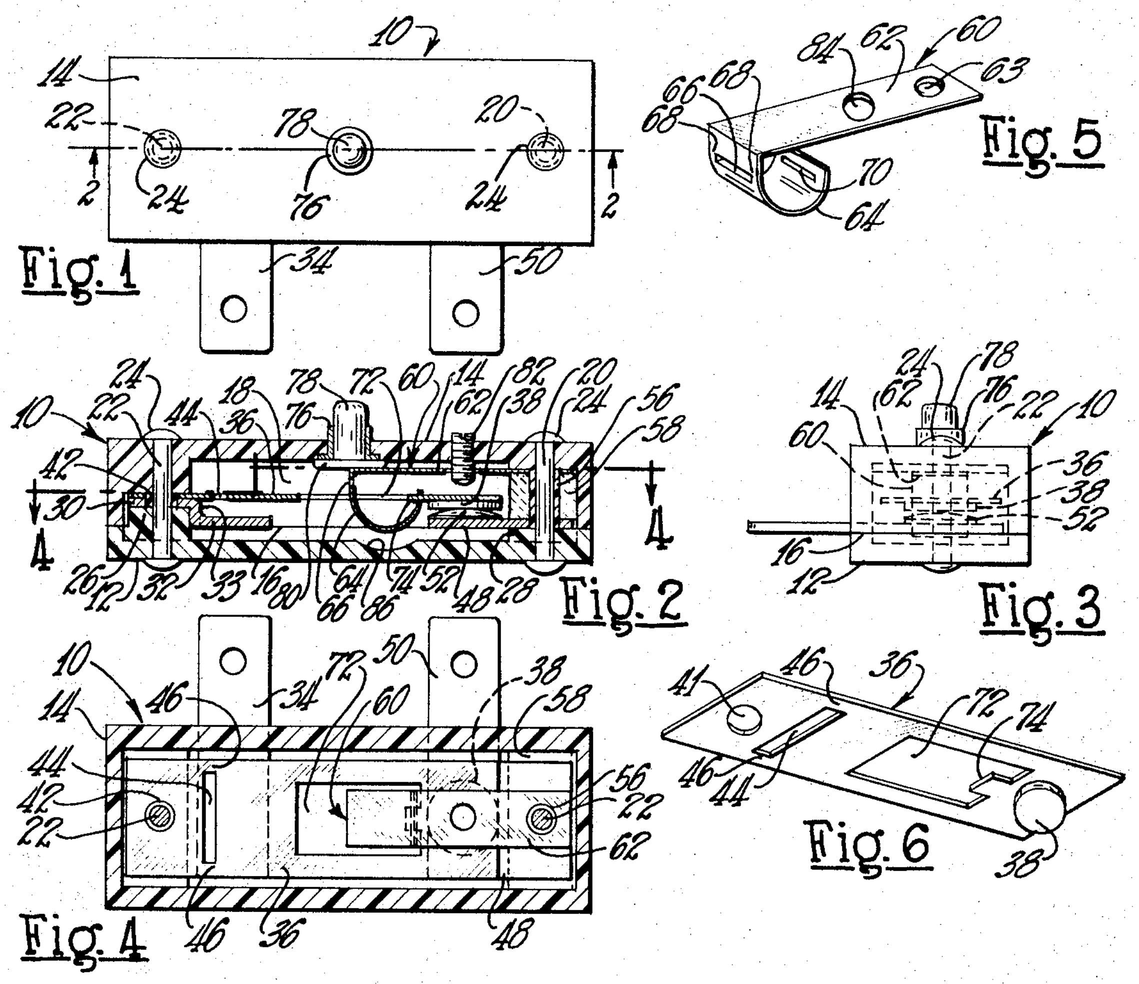
FIG. 1 is a top plan view of one form of microswitch or snap switch construction of the invention particularly illustrating the enclosing housing and terminal connectors.
FIG. 2 is a longitudinal sectional view through the switch mechanism, the view being taken substantially on the line 2—2 of FIG. 1.
FIG. 3 is an end view of the switch construction of FIGS. 1 and 2.
FIG. 4 is a horizontal sectional view taken substantially on the line 4—4 of FIG. 2.
FIG. 5 is an isometric view of a snap action spring forming a component of the switch construction.
FIG. 6 is an isometric view of a relatively movable switch arm member of the switch construction.

Referring to the drawings in detail and initially to the form of switch construction shown in FIGS. 1 through 4, the switch mechanism is enclosed within a housing construction 10. The housing construction 10 comprises two components or sections 12 and 14 which are mated or engaged at a plane 16. The housing components 12 and 14 are of hollow configuration and are molded of insulating material as, for example, molded resinous plastic of conventional character.

The housing construction provides support means for the operative switch components contained within the hollow interior or chamber 18 provided by the housing components. The housing components are joined together after the components of the switch mechanism are assembled within the chamber 18 by means of headed rivets 20 and 22 extending through aligned openings in the housing components, each rivet being swaged to provide a head 24 on the opposite end thereof whereby the housing and switch components are permanently retained in assembled relation.

The lower housing component or section 12 is fashioned with a raised portion or platform 26 near the left end of the housing, as viewed in FIG. 2, and a second raised portion or platform 28 at the right-hand end of the housing. Mounted upon the platform 26 is a portion 30 of a member 32, the member having a portion 34 providing one terminal which extends exteriorly of the housing for connection in an electric circuit. The portion 30 is offset as at 33 with respect to the terminal portion 32. Welded or otherwise secured to the upper surface of the offset portion 30 is the end region of a relatively movable or flexible switch arm 36 carrying a contact 38 at its distal end.

The offset portion 30 of terminal member 32 is fashioned with an opening 40 and the switch member 36 fashioned with a similar opening 41, these openings being aligned, as shown in FIG. 2, and accommodate a tubular sleeve or bushing 42 of insulating material, the rivet 22 extending through the insulating sleeve 42. The switch arm 36 is of comparatively thin flexible metal and is fashioned with a transversely extending slot 44 providing portions 46 of reduced cross section serving as hinge regions or flexing zones to facilitate flexure or pivotal movement of the switch arm 36 about the hinge regions.

The switch construction of FIGS. 1 through 8 includes a second terminal member 48 having a terminal portion 50 extending exteriorly of the housing. The member 48 is equipped with a contact 52 which cooperates with contact 38 for completing and interrupting a circuit in which the switch may be intercalated. The contact-carrying member 48 is fashioned with an opening 54 to accommodate an insulating sleeve 56, shown in FIG. 2, the sleeve also extends through an opening provided in a spacing member or block 58 of insulating material. The rivet 20 extends through the insulating sleeve 56.

Means is provided for effecting snap action of the relatively movable switch member 36. This means includes a flexible, comparatively thin metal member or spring 60, shown in detail in FIG. 5, which includes a planar portion 62 and an arcuately-shaped or curved portion 64. An end region of the planar portion 62 is provided with an opening 63 to accommodate the upper end of the insulating sleeve 56, as shown in FIG. 2, for insulating the member 60 from the rivet 20.

The curved portion 64 is fashioned with a first slot or opening 66 extending transversely of the member 60 forming portions 68 of reduced cross section. The portions 68 provide weakened regions or hinge regions about which the curved portion may be flexed in obtaining a snap action movement of the switch arm 36. The distal end region of the curved portion 64 is provided with a second slot 70. The relatively movable switch member 36 is fashioned with an open area 72 to provide clearance space for movement of the curved portion 64 of member 60. The member 36 adjacent the contact 38 is fashioned with a tongue or projection 74 extending into the space 72.

In assembly of member 36 with member 60 in the housing construction, the slot 70 in the curved portion 64 receives the tongue 74 in the manner illustrated in FIG. 2. As particularly shown in FIG. 2, the housing component 14 is fashioned with an opening which snugly receives a bushing 76 in which is slidably mounted a plunger or button 78, the plunger having an enlarged flange portion or head 80 in engagement with the planar portion 62 of member 60 adjacent its juncture with the curved portion 64.

The plunger 78 is readily slidable in the bushing 76 and when depressed, effects a separation of the contacts 38 and 52 under the snap action movement provided by the curved portion 64 of member 60. The plunger 78 may be engaged by abutment means of other mechanisms for actuating the microswitch. The wall of housing component 12 is fashioned with a recess 86 to accommodate downward movement oft he curved portion 64 of member 60.

In the operation of the switch construction, with particular reference to FIG. 2, the contacts 38 and 52 are normally in engagement to complete a circuit across the switch terminals 34 and 50. Downward pressure upon the plunger 78, as viewed in FIG. 2, flexes the distal end region of planar portion 62 and the curved portion 64 downwardly which exerts or establishes a force or stress acting upwardly on the distal end region of the switch member 36 effecting a snap action flexure movement of the switch arm 36 upwardly to rapidly separate the contacts 38 and 52.

When pressure is removed from the plunger 78, the inherent stress in the planar portion 62 of member 60 automatically returns the curved portion 64 to its initial position, this movement of member 60 elevating the hinge regions 68 above the zone of connection of the tongue 74 with the curved portion 64. This movement exerts a downward force on the switch member 36 through the curved portion 64 causing the contact 38 to again reengage the contact 52 by a snap action movement.

As shown in FIG. 2, the upper wall of the housing component 14 is provided with a threaded opening to receive a threaded member or screw 82, the member 82 extending downward through an enlarged clearance opening 84 in the member 62. The screw or member 82 provides an adjusable abutment means for limiting the upward flexure or movement of the switch arm 36 to regulate the extent of opening movement of the switch arm 36 in contact-disengaged position. The spring member 60 for securing snap action of the switch arm is configurated and stressed to normally maintain contact 38 in engagement with contact 52, and disengagement of the contacts is maintained only so long as presure is maintained on the actuator or plunger 78. Release of pressure on the plunger enables the spring 60 to return to its normal position of engaging the contacts.

The actual switch construction fashioned according to FIGS. 1 through 4 is approximately one-half the size of the illustration in FIGS. 1 through 4. Thus, the switch construction is very compact but is efficient and reliable and capable of carrying substantial current. The arrangement provides a miniature switch or microswitch adaptable for use in controlling various electrically energizable instrumentalities or in any arrangement wherein circuit control may be exercised by depression of the plunger 78.

FIGS. 9 through 12 illustrate a modification of the switch construction of the invention. The housing 90 is similar to the housing 10 and comprises two mating sections or components 92 and 94 which meet or mate at a plane 95. The housing sections 92 and 94 are of molded resinous material and are hollow providing an interior chamber 96. After assembly of the switch components in the housing construction, the housing sections 92 and 94 are secured together by rivets 20′ and 22′, the ends of the rivets being swaged as at 24′. The lower housing section 92 is fashioned with a raised portion or platform 98 near the left end of the housing and a second platform portion 100 at the right end.

Figure 7:
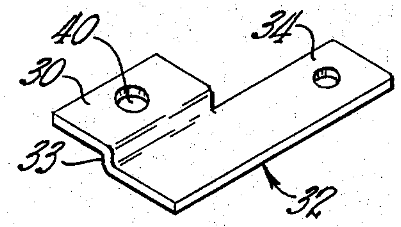
FIG. 7 is an isometric view of one of the terminal connectors of the switch construction.
Figure 8:
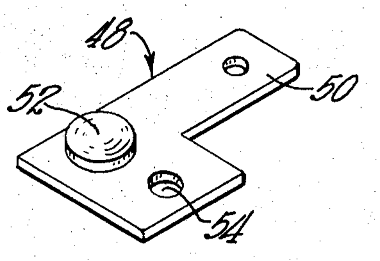
FIG. 8 is an isometric view of the other terminal connector mounting a switch contact.

The switch construction is inclusive of a terminal connector member 102, which is similar to member 32 shown in FIG. 7. The terminal connector member 102 has an offset portion 104 which is supported on the platform portion 98 of the housing, as shown in FIG. 9.

Welded or otherwise secured to the upper surface of the offset portion 104 is the end region of a relatively movable or flexible switch arm 106 carrying a contact 108 near its distal end. The offset portion 104 of the terminal connector 102 and the switch member 106 are fashioned with aligned openings to accommodate a tubular sleeve or bushing 110 of insulating material surrounding the rivet 22′ for insulating the terminal 102 and switch arm 106 from the rivet 22′.

The switch arm 106 is similar to the switch arm 36, being fashioned of comparatively thin flexible spring metal having a transversely extending slot 112, similar to the slot 44 in switch arm 36, providing hinge regions 114 or flexing zones to facilitate flexing movement of the switch arm 106 about the hinge regions. The switch construction includes a second terminal connector member 116, similar to the member 48 shown in FIG. 8. The member 116 is fashioned with an opening in one end thereof to accommodate a sleeve or bushing 118 of insulating material to insulate the member 116 from the rivet 20′.

Figures 9, 11, 12:
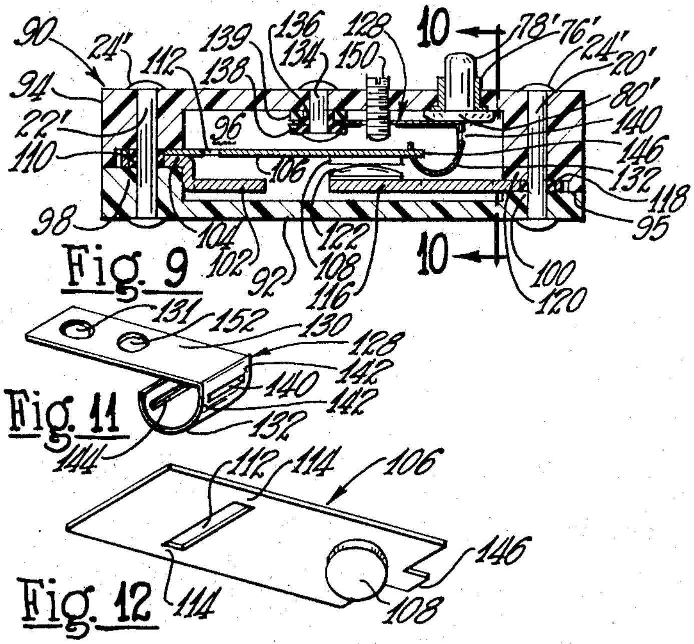
FIG. 9 is a longitudinal sectional view similar to FIG. 2 illustrating a modified form of switch construction of the invention.
FIG. 11 is an isometric view of the snap action spring forming a component of the construction shown in FIG. 9.
FIG. 12 is an isometric view of the movable contact carrying member or switch arm of the switch construction shown in FIG. 9.
Figure 10:
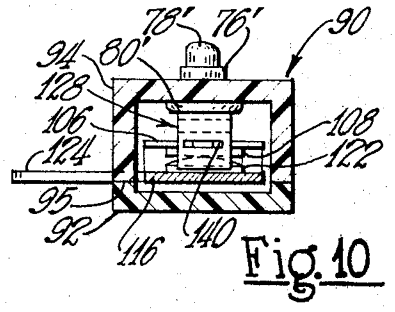
FIG. 10 is a transverse sectional view taken substantially on the line 10—10 of FIG. 9.

The terminal member 116 is disposed between the platform portion 100 and the lower surface of a portion 120 of the upper housing section 94 as shown in FIG. 9. The member 116 is equipped with a contact 122 for cooperation with the contact 108. The member 116 has a terminal portion 124 extending exteriorly of the housing 90 as shown in FIG. 10, the member 102 also having a similar terminal portion extending laterally from the housing 90.

The switch construction of FIG. 9 includes means for effecting snap action of the movable or flexible switch arm 106. The switch construction includes a resilient means or spring member 128 comprising a planar portion 130 and a curved or arcuately-shaped portion 132. An end of the planar portion 130 is anchored to the housing section 94 by means of a rivet 134. The planar portion 130 of member 128 is fashioned with an opening 131 to accommodate a tubular member 136 of insulating material having a flange portion 138 adjacent the head of the rivet 134. Surrounding the upper portion of the tubular member 136 is an insulating washer 139. In this manner the member 128 is supported by the housing but is electrically insulated therefrom.

The curved portion 132 is fashioned with a transversely extending slot 140 which provides hinge regions 142 of reduced cross-section to facilitate flexure of the curved portion 132 about the hinge regions 142. The distal end region of the curved portion 132 is fashioned with a second slot 144. As particularly shown in FIG. 12, the relatively movable switch member 106 is formed at its distal end with a tongue or projection 146. In assembly with spring member 128 as shown in FIG. 9, the tongue 146 extends into the slot 144 in the curved portion 132 of the spring member 128.

The upper component 94 of the housing is fashioned with an opening adjacent the movable end region of the planar portion 130 which receives a bushing 76′ snugly fitted into the opening.

Slidably mounted in the bushing 76′ is an actuating plunger, member or button 78′, the plunger having a head 80′ engaging the planar portion 130 of member 128 at the region of its juncture with the curved portion 132.

By depressing the plunger 78′, the portion 130 is flexed downwardly and, as the switch member 106 is inhibited from downward movement by engagement of the contacts, the curved portion 132 is flexed or distorted upwardly to effect snap action movement of the switch arm 106 about its hinge regions 114, thus rapidly separating the contacts 108 and 122. In this form of switch mechanism, the curved portion 132 engages the tongue 146 on the end of the switch member 106 whereby relative movement of the curved portion 132 takes place beyond the end of the switch member 106.

The wall of the housing component 94 is fashioned with a threaded opening to accommodate a threaded member or screw 150 which extends through a clearance opening 152 in the spring member 128. The threaded member 150 provides an abutment means for limiting the extent of upward or opening movement of the switch arm 106, the threaded member 150 being adjustable to regulate the extent of upward or contact-opening movement of the switch member 106.

The operation of the switch construction of FIG. 9 is similar to the operation of the switch construction shown in FIG. 2. The metal switch member or arm 106 is normally stressed to engage the contact 108 with the contact 122 and is further biased to contact-engaging position by the stress in the curved portion 132 of the spring 128 in its normal position shown in FIG. 9.

When pressure is exerted on the plunger 78′ moving the plunger downwardly, the plunger flexes the distal end of the spring member 130 downwardly which results in an upward flexure of the curved portion 132 of the spring 128 to separate the contact by snap action and interrupt the circuit with which the switch may be connected.

Upon relieving pressure on the plunger 78′, the stress in the switch member 106 and the stress in planar portion 130 and curved portion 132 of member 128 return the switch arm 106 by snap action to its normal contact-engaging position, as shown in FIG. 9. The plunger 78′ may be manually actuated or may be actuated by any moving instrumentality wherever the use of a microswitch may be desired or have utility.

FIGS. 13 through 16 illustrate another modification of microswitch construction of the invention. The switch is inclusive of a housing 160 fashioned of two sections or components 162 and 164 which are respectively similar to the housing sections 12 and 14 shown in FIG. 2, the sections being of a hollow configuration and molded of resinous plastic or other insulating material. The housing sections are engaged or mated at the plane indicated at 166. The hollow housing sections provide a chamber 168 in which the switch mechanism is disposed. After assembly of the switch mechanism in the housing sections, the sections are secured together by headed rivets 20″ and 22″.

Figures 13, 15, 16:
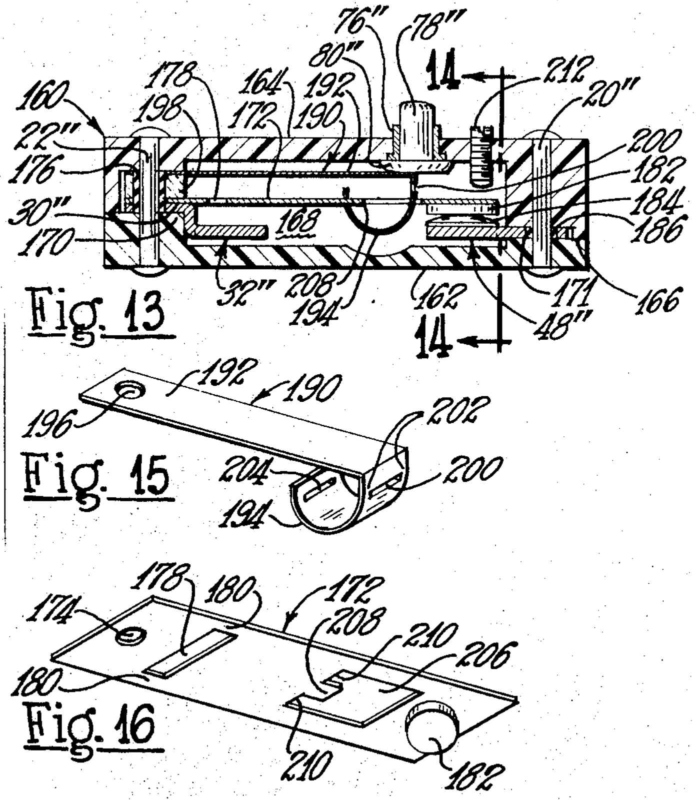
FIG. 13 is a sectional view similar to FIG. 2 illustrating a further modification of switch construction of the invention.
FIG. 15 is an isometric view of the snap action spring forming a component of the switch construction shown in FIG. 13.
FIG. 16 is an isometric view of the movable current conducting member of the switch shown in FIG. 13.
Figure 14:
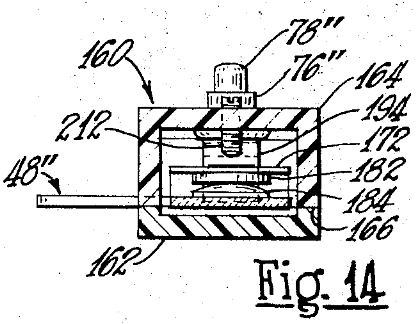
FIG. 14 is a transverse sectional view taken substantially on the line 14—14 of FIG. 13.

The housing section 162 is fashioned with a raised or platform portion 170 adjacent the left end as viewed in FIG. 13, and a surface 171 at the other end of the housing section. Mounted upon the raised portion 170 is an offset portion 30″ of a terminal member 32″. Welded or otherwise secured to the offset portion 30″ is an end region of a relatively movable or flexible metal switch arm 172. The switch arm 172 is fashioned with an opening 174 and the offset portion 30″ of member 32″ provided with a similar opening to accommodate a sleeve or bushing 176 of insulating material as shown in FIG. 13.

The switch arm 172 is formed with a slot 178 providing portions 180 which serve as hinge regions or flexing zones to facilitate flexure of the switch arm 172. The distal end of the switch arm 172 is equipped with a contact 182. The switch construction includes a second terminal member 48″ equipped with a contact 184 for cooperation with the contact 182. The terminal construction 48″ is the same as the terminal 48 shown in FIGS. 2 and 8. The terminal 48″ is insulated from the rivet 20″ by a sleeve or bushing 186 of insulating material surrounding the rivet 20″ and disposed in an opening in the terminal member 48″.

The switch construction of FIGS. 13 through 16 includes an arrangement for effecting snap action movement of the movable switch arm 172 comprising a resilient member or spring 190 having a planar portion 192 and a curved or arcuately shaped portion 194. In this form of the invention, an end of the planar portion 192 is anchored to the housing construction adjacent the rivet 22″. The planar portion 192 is fashioned with an opening 196, the insulating bushing 176 extending through the opening 196 to insulate member 190 from the rivet 22″.

Disposed between the switch arm 172 and the spring 190 adjacent the fivet 22″ is a spacer member or block 198 of a thickness to effect a fastening or anchoring of the adjacent ends of the switch arm 172 and the planar portion 192 of the spring under the influence of the pressure of the rivet 22″. The curved portion 194 of member 190 is fashioned with a first transversely extending slot 200 providing hinge regions 202 of reduced cross-section to facilitate flexure of the curved portion 194 about the hinge regions. The distal end region of the curved portion 194 is fashioned with a second slot 204.

As shown in FIG. 16, the flexible switch member or arm 172 is fashioned with a generally rectangular opening 206, the member having an integral tongue or projection 208. In assembly with the switch member 172, the tongue 208 extends into the slot 204 in the curved portion 104 of member 190. The edge regions 210 of member 172 adjacent the tongue or projection 208 engage the curved portion 194 adjacent the slot 204 to provide, in effect, a toggle action. The upper section 164 of the housing is fashioned with an opening adjacent the movable end of the planar portion 190 to receive a bushing 76″ snugly fitted into the opening.

Slidably mounted in the bushing 76″ is a plunger or button 78″, the flange or head portion 80″ thereof engaging the end region of the planar portion 192 at its zone of juncture with the curved portion 194. The upper section 164 of the housing is fashioned with a threaded opening to receive a threaded member or adjusting screw 212.

The screw 212 provides an abutment means which may be adjusted manually to limit the extent of movement of the arm 172 in contact-disengaging position. The switch arm 172 and the spring member 190 have their adjacent end regions fixedly anchored in position by means of the rivet 22″.

The operation of the switch mechanism illustrated in FIGS. 13 through 16 is similar to the operation of the switch mechanism shown in FIG. 9. By depressing the plunger 78″, the region of the planar portion 192 spaced from the rivet 22″ is flexed downwardly. This movement of the planar portion 190 in a downward direction causes flexure of the curved portion 194 upwardly, establishing forces to effect snap action movement of the switch member 172 downwardly to rapidly disengage the contacts 182 and 184.

The abutment screw 212 limits the upward movement of the switch arm 172. The inherent flexure in the spring 190 is effective to return the spring to its initial position as shown in FIG. 13 when pressure is released from the plunger 78″, thus automatically effecting movement of the switch arm 172 to reengage the contacts through snap action facilitated through the connection between the curved portion 194 and the switch arm 172.

Another form of switch construction of the invention is illustrated in FIGS. 17 through 23. The switch construction 220 includes a housing 222 fashioned of an upper section 223 and a lower section 224, the section 224 being hollow to provide a switch compartment or chamber 225.

The housing sections are of molded resinous or plastic insulating material. The components of the switch housing are secured together in assembly by means of bolts 226 and 228 which receive securing nuts 230.

Figures 17, 18, 19, 20, 21, 22, 23:
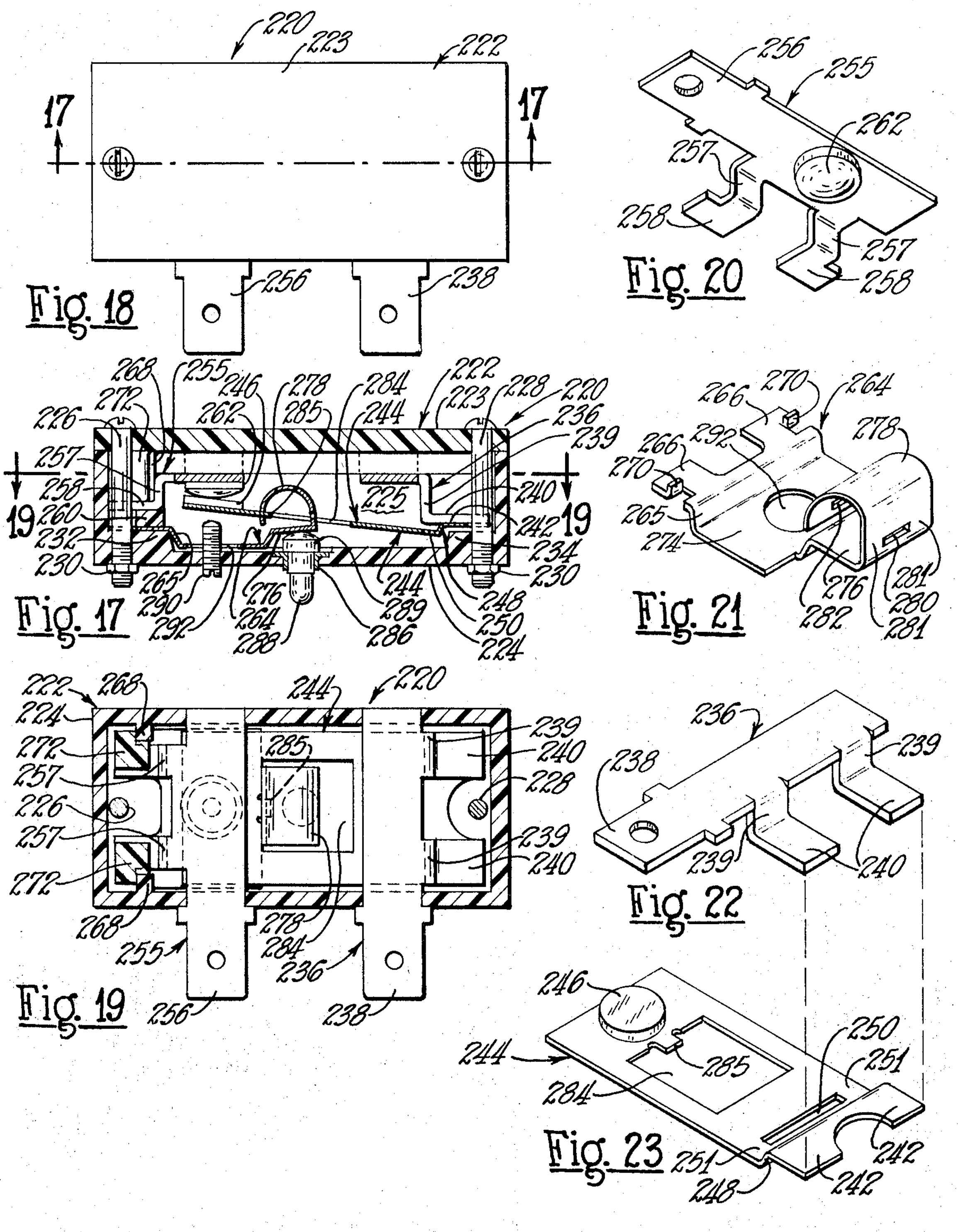
FIG. 17 is a longitudinal sectional view taken substantially on the line 17—17 of FIG. 18 illustrating another modification of switch construction of the invention.
FIG. 18 is a top plan view of the housing construction of the switch shown in FIG. 17.
FIG. 19 is a sectional view taken substantially on the line 19—19 of FIG. 17.
FIG. 20 is an isometric view of a combined terminal and contact carrying component of the switch mechanism shown in FIG. 17.
FIG. 21 is an isometric view of a snap action spring forming a component of the switch mechanism of FIG. 17.
FIG. 22 is an isometric view of the other terminal member of the switch construction shown in FIG. 17.
FIG. 23 is an isometric view of a flexible current conducting member or switch arm of the construction shown in FIG. 17.

The lower housing section 224 is fashioned with a platform portion or boss 232 near the left end of the housing, as viewed in FIG. 17, and a second patform portion 234 at the right end of the housing. The switch construction is inclusive of a member 236, shown in detail in FIG. 22, having a terminal portion 238 which extends through a slot in the side wall of the housing component 224 and exteriorly of the housing, the opposite end of the terminal member 236 extending into a slot in the housing section 224. The member 236 has spaced offset portions 239 which terminate in extensions or pad portions 240. Welded to the lower surfaces of the pad portions 240 are leg portions 242 of a relatively movable or flexible metal switch member or arm 244, shown in detail in FIG. 23. Thus the switch arm 244 is anchored to the pad portions 240 of member 236 and member 236 is supported solely by the portions extending into slots in the housing section 224.

The distal end region of the switch arm 244 is equipped with a contact 246. The leg portion 242 of the switch arm 244 are offset as at 248 from the major portion of the switch arm, as shown in FIGS. 17 and 23. The region of the switch arm 244 adjacent the offset portion 248 is fashioned with a transversely arranged slot 250 which forms zones 251 of reduced cross section providing hinge regions to facilitate flexing or piovtal movement of the switch arm about the hinge regions.

A second terminal member 255 is fashioned with a terminal portion 256 which extends exteriorly of the housing, as shown in FIGS. 18 and 19. The member 255 has integral spaced offset portions 257 which terminate in pad portions 258. The pad portions engage a spacer block 260 shown in FIG. 17. The member 255 is fashioned with a contact 262 for cooperation with contact 246.

The switch is inclusive of a spring means or resilient member 264 shaped to provide snap action movement for the switch arm 244. As shown in FIG. 21, the member 264 has an offset portion 265 terminating in spaced pad portions or extensions 266 which are mounted upon the platform portion 232 as shown in FIG. 17. As shown in FIG. 19, the side walls of the housing section 224 are fashioned with a pair of vertically extending integral portions or ways 268. The pads or extensions 266 of spring member 264 are fashioned with struck up lugs or projections 270 which engage the side surfaces of the vertical portions 268 at the left sides of the portions as viewed in FIG. 19 to position the member 264 in the housing.

The spacer block 260 engages the upper surfaces of the pad portions 266. The housing section 222 is fashioned with depending portions 272, the lower ends of which engage the pads 258 on member 255.

In this manner the assembly of the housing section 223 with the housing section 224 assures proper positioning of the components within the housing and prevents dislodgment of the components. The spring member 264 has a planar portion 274 integrally joined with an offset portion 276, the latter being integrally connected with an arcuately-shaped portion 278. The curved portion 278, near its juncture with portion 276, is fashioned with a transverse slot 280 forming zones 281 of reduced cross section providing hinge regions for the curved portion.

The distal end region of the curved portion 278 is fashioned with a second transverse slot 282, as shown in FIG. 21. As shown in FIG. 23, the switch member 244 is fashioned with a generally rectangularly-shaped space 284 providing clearance space for the curved portion 278 of member 264, one of the edge regions defining the space being fashioned with a projection or tongue 285. In assembly, the projection or tongue 285 is received in the slot 282 of the curved portion 278. An opening in the wall of housing section 224 snugly accommodates a bushing 286. Slidably mounted in the bushing 286 is a plunger or button 288 having a head portion 289 engaging the portion 276 of member 264.

The housing section 224 is fashioned with a threaded opening receiving a threaded member or screw 290 which forms an adjustable abutment means for limiting the extent of contact-disengaging movement of the switch arm 244. The planar portion 274 of the spring member 264 is fashioned with an opening 292 for clearance to accommodate abutment screw 290.

In assembling the switch mechanism, the plunger 289 is inserted in the bushing 286 and the spring member 264 disposed with the pad portions 266 on the platform 232. The spacing block 260 is disposed on the pads 266 and the terminal member 255 assembled with the pads 258 on the insulating block 260.

The assembly of terminal member 236 and the movable switch member 244 is inserted in the housing section 224 with the pad portions 242 of the switch member engaging the platform 234 and the tongue 285 of the switch arm 244 extending into the slot 282. The upper housing section 223 is then placed in position wherein the depending portions 272 engaging the pads 258, and portions of the terminal member 236 and 255, extend through slots provided in the side walls of the housing section 224. The bolts 226 and 228 are inserted and the cooperating nuts drawn up to secure the housing sections together and the switch components in their respective positions.

In operation, the inherent flexure in the switch arm 244 engages the contact 246 with contact 262 to normally complete a circuit through the switch. Upon movement of the plunger 288 toward the interior of the housing the plunger flexes the unanchored regions of the member 264 upwardly. This upward movement causes downward flexure or distortion of the curved portion 278 about the hinge regions 281 providing a snap action effective to flex the switch member 244 downwardly, thus rapidly separating the contacts 246 and 262.

Upon relieving pressure on the plunger 288, the inherent flexure in the switch member 244 and the spring member 264 causes snap action movement of the switch arm or member 244 in the opposite direction to reengage the contacts 246 and 262. It is to be understood that rivets may be used to secure the housing sections together in lieu of the bolts 226 and 228 and nuts 230 as in other forms of the invention heretofore described.

FIGS. 24 through 31 illustrate a modified form of switch construction of the invention wherein the contact on the movable switch arm engages a resiliently supported contact mounted in a manner to avoid tendency of rebound of the movable switch arm by reason of impact of contact engagement. The switch mechanism, shown in FIGS. 24 through 31, is of the general character of the switch mechanism shown in FIGS. 17 through 23. The switch construction 300 includes a housing comprising an upper section **223*a* and a lower housing section 224*a*, the sections being of insulating material and secured together in assembly by bolts 226*a*, 228*a* and cooperating nuts 230*a***.

The housing sections provide a chamber **225*a* containing the switch components. The housing section 224*a* is provided at its respective end regions with platform portions 232*a* and 234*a*. A first terminal member 236*a* has spaced offset pad portions 240*a* and a terminal portion 238*a* extending exteriorly of the housing. A relatively movable switch arm 304 is fashioned at one end with leg portions 306 which engage and are spot welded or otherwise secured to the pad portion 240*a* of the terminal member 236*a*. The switch member 304 is equipped with a contact 307**.

Figures 24, 25, 26, 27, 28, 29, 30:
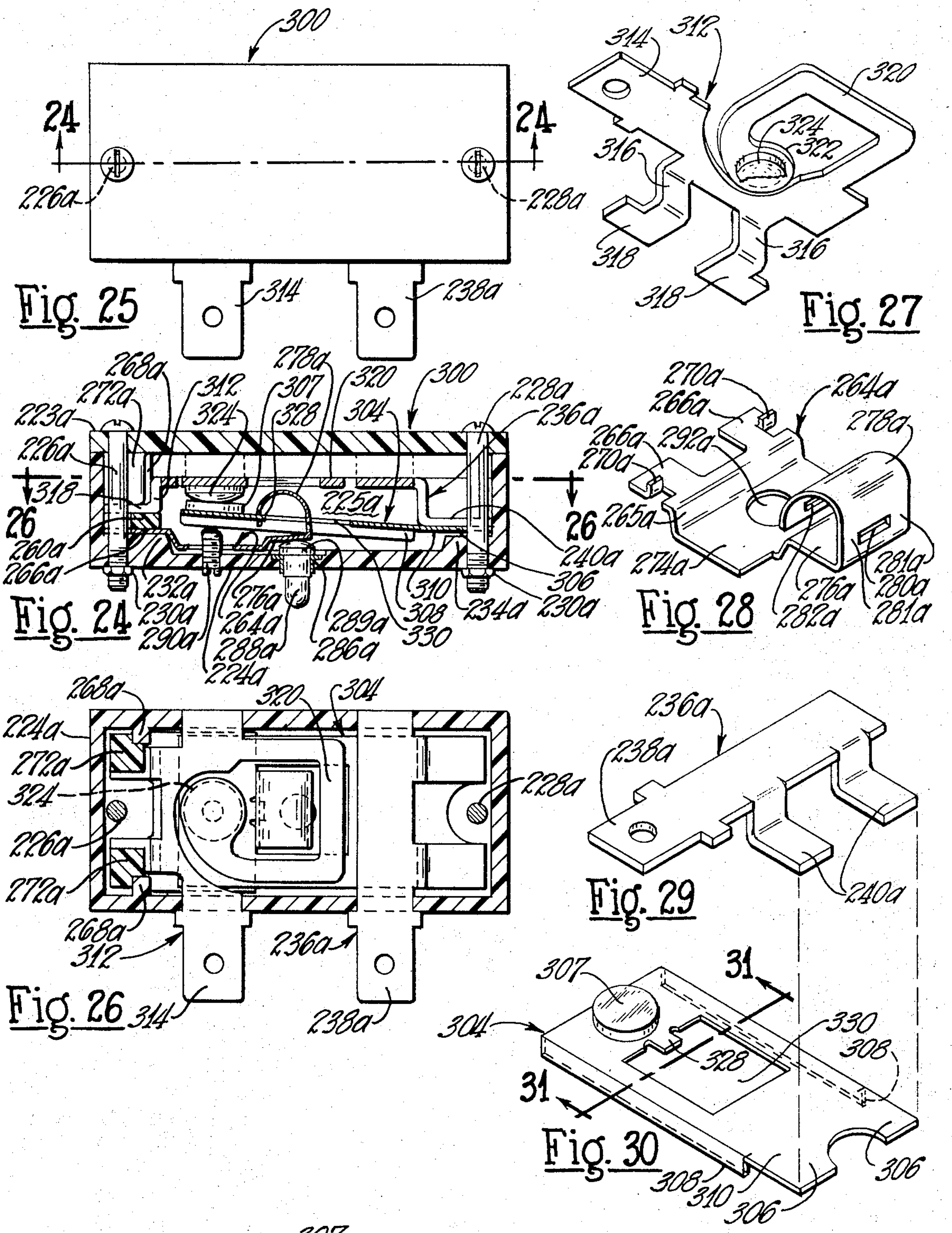
FIG. 24 is a sectional view taken substantially on the line 24—24 of FIG. 25 showing another form of microswitch construction of the invention.
FIG. 25 is a top plan view of the switch construction shown in FIG. 24.
FIG. 26 is a sectional view taken substantially on the line 26—26 of FIG. 24.
FIG. 27 is an isometric view of a combined terminal and contact carrying member forming a component of the switch mechanism shown in FIG. 24.
FIG. 28 is an isometric view of a snap action spring of the switch mechanism shown in FIG. 24.
FIG. 29 is an isometric view of the other terminal member of the switch construction shown in FIG. 24.
FIG. 30 is an isometric view of a relatively movable current conducting member or switch arm of the construction shown in FIG. 24.
Figure 31:
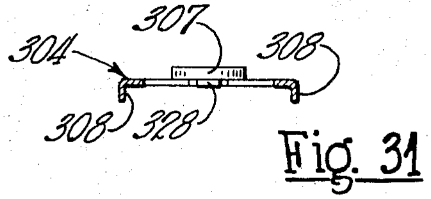
FIG. 31 is a fragmentary detail sectional view taken substantially on the line 31—31 of FIG. 30.

As particularly shown in FIGS. 24 and 30, the side edges of the switch member 304 are fashioned with lengthwise arranged flanges 308 which terminate a slight distance from the leg portions 306 at a hinge region 310. The switch member 304 is made of comparatively thin spring metal and is adapted to have pivotal or flexible movement about the hinge region 310 adjacent the ends of the flanges 308. The purpose of the flanges 308 is to provide additional metal for the switch arm in order that the switch arm can accommodate substantial currents without heating and to establish a degree of rigidity throughout a major portion of the length of the switch arm or member 304 to facilitate efficient switch operation as hereinafter explained.

The terminal portion **238*a* and the opposite end region of member 236*a* extend into slots in the housing section 224*a*, this means forming the sole support for the terminal member 236*a* and the pad portions 240*a* providing an anchor for the end of the switch arm 304. The switch arm is spaced from the housing portion 234*a* in order to provide ample flexure region 310. The switch construction includes a contact-carrying terminal member 312, shown particularly in FIG. 27, fashioned with a terminal portion 314 extending through an opening in the housing wall. The terminal member 312 is integrally formed with offset portions 316 terminating in pad portions or extensions 318 which are engaged with a spacer block 260*a*** of insulating material, as shown in FIG. 24.

In this form of construction the terminal member 312 is fashioned with an integral loop portion 320, as shown in FIG. 27, having a distal end 322 of disc-like circular configuration. A contact 324 is supported or carried by the disc-like portion 322 at the end of the loop portion 320.

The circuitous length of metal provided by the loop portion 320 between the body of the terminal member 312 and the contact 324 carried at the terminus of the loop portion establishes a limited degree of resiliency for the contact 324.

The contact 324 is, in effect, a relatively stationary contact but when supported in the manner illustrated in FIG. 27 at the terminal region of the loop 320, the contact and its support are moved slightly from an initial position when the switch arm 304 is moved by snap action and impinges the contact 307 against the contact 324. Further explanation of this action is hereinafter set forth.

The means for establishing snap action movement of the switch arm 304 is inclusive of a spring member **264*a* configurated with a planar portion 274*a* and an offset region 265*a* terminating in spaced pad portions or extensions 266a, the pad portions being provided with upwardly extending lugs or projections 270a which engage the vertical bar-like portions 268a on the side walls of housing section 224a. A portion 276a of the spring member 264a is integrally joined with a curved portion 278a. A region of the curved portion 278a near the portion 276a is fashioned with a slot 280a to provide hinge regions 218a** to facilitate flexture of the curved portion.

The curved portion 278a is provided with a second slot 282a which, in assembly, receives a tongue or projection 328 on the switch arm 304, shown in FIG. 30. The switch arm 304 is fashioned with a rectangular space 330 to accommodate the curved portion 278a of the spring member 264a.

The pad portions 266a of the spring member 264a are anchored adjacent the block 260a by reason of the depending projections 272a of the housing section 223a engaging the pads 318 of the terminal member 312. The housing section 224a is provided with an opening snugly receiving a bushing 286a in which is slidably mounted a plunger or button 288a having a head portion 289a engaging portion 276a of the snap action spring.

The housing section 224a is fashioned with a threaded opening to receive an adjustable abutment screw 290a for limiting the opening movement of the switch arm 304. The planar portion 274a of the switch member 264a is fashioned with a clearancce opening 292a to accommodate the abutment screw 290a.

The operation of the switch mechanism illustrated in FIGS. 25 through 31 is as follows: The inherent stress in the spring member 264a and that in the switch arm 304 coupled with the upwardly acting force vector provided by the curved portion 278a on the switch arm 304 normally maintains the switch-arm contact 307 in engagement with the contact 324 carried by the loop portion 320 of the terminal member 312. As illustrated in the drawings, the thickness of the metal member 312 including the loop portion 320 is substantially greater than the thickness of the switch arm 304, but by reason of the loop construction 320, a limited degree of resilience is provided for the contact 324 through the loop construction 320.

With the contacts in engagement, the resistance or strength of the support loop 320 of the contact 324 is sufficient to resist, with only slight displacement, the force transmitted through the switch arm 304 and spring member 264a so that engagement of contacts 307 and 324 is normally maintained. Pressure exerted on the plunger 288a inwardly of the housing flexes or distorts the member 264a and particularly the curved portion 278a until the flexure or distortion of the curved portion 278a is effective to move the switch arm 304 downwardly with rapid snap action about its flexing region 310, separating the contacts and interrupting the circuit through the switch, the abutment screw 290a serving to limit the extent of movement of the switch arm 304 in its lowermost or contact disengaging position.

Upon release of pressure on the plunger 228a, the stress established in the member 264a including the curved portion 278a is relieved and the movable regions of the spring member 264a return toward their normal positions thus effecting snap action movement of the switch arm 304 toward contact engaging position. Under the stress of member 304 and the force in the distorted curved portion 278a of the spring member, the contact 307 and the switch arm 304 move toward contact-engaging position with substantial velocity and hence with comparable momentum. The momentum at impact of engagement of contact 307 with contact 324 is absorbed or cushioned by slight reaction movement of the contact 324 through the loop construction 320.

In the switch constructions hereinbefore described wherein the stationary contact is substantially rigidly supported, under the impact of engagement of the movable contact with the stationary contact under the influence of the momentum of the switch arm and contact propelled by the snap action spring, instances have been encountered where there may be a tendency for the movable contact to rebound slightly and tend to cause arcing of the contacts.

In the arrangement shown in FIGS. 25 through 31, the contact 324, under the impact of the moving contact 307, is slightly displaced in the direction of impact and this limited displacement or distortion of the loop construction 320 provides sufficient cushioning or shock absorbing action to eliminate rebound movement of the movable contact 307 and any tendency for arcing is eliminated. The stiffening flanges 308 on the movable switch arm 304 substantially eliminate any tendency for the movable switch arm to vibrate by reason of the forces of impact.

Figures 32, 33, 34, 35, 36, 37:
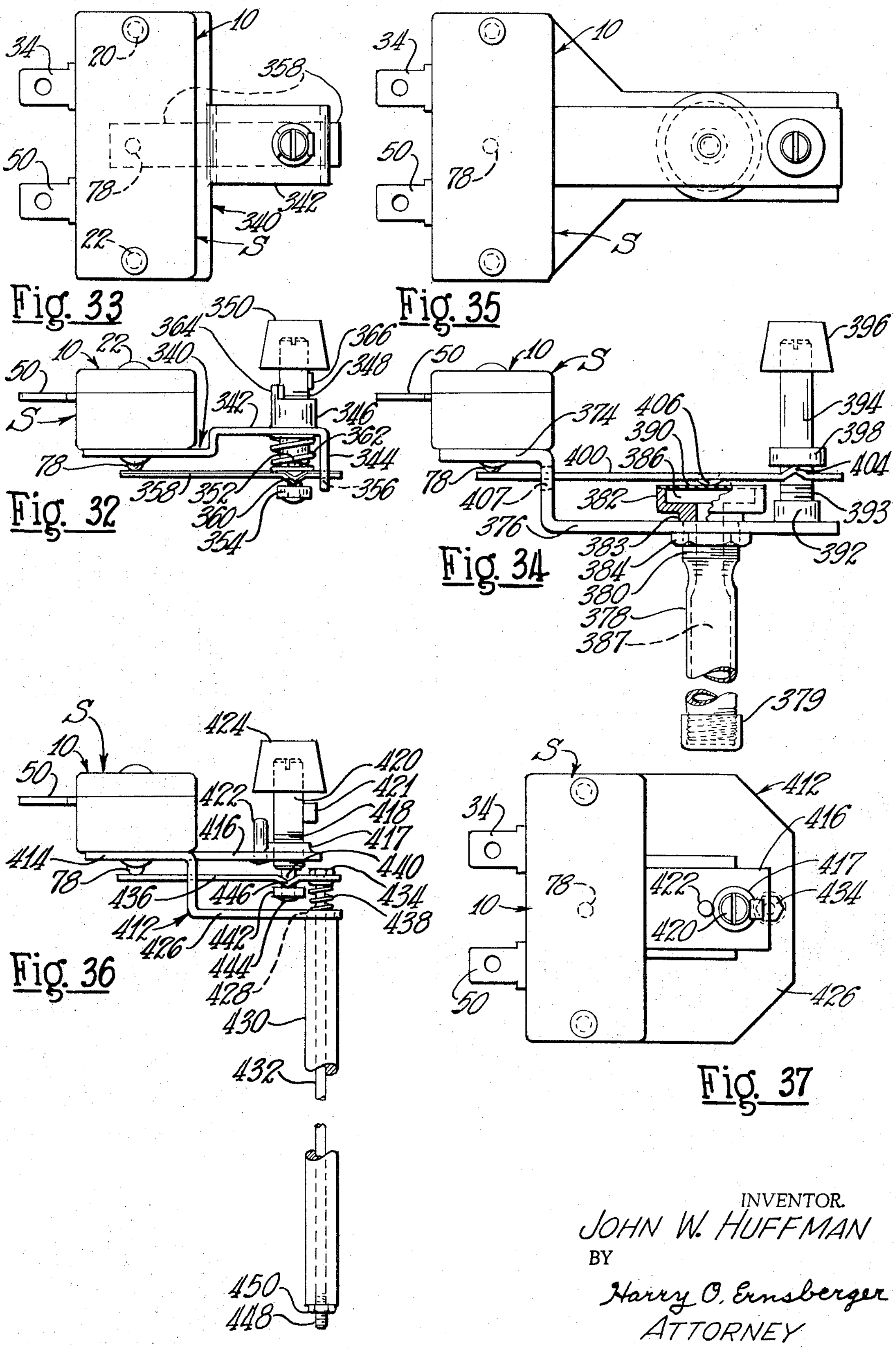
FIG. 32 is an elevational view of a combined microswitch and manually adjustable thermoresponsive actuating means for the microswitch.
FIG. 33 is a top plan view of the construction shown in FIG. 32.
FIG. 34 is an elevational view illustrating a combined microswitch and thermoresponsive media for controlling the microswitch.
FIG. 35 is a top plan view of the construction shown in FIG. 34.
FIG. 36 is an elevational view of a combined microswitch and thermoresponsive media of a modified character for actuating the microswitch.
FIG. 37 is a top plan view of the construction shown in FIG. 36.

FIGS. 32 and 33 illustrate one form of combination of the microswitch and a thermoresponsive control for actuating the microswitch. The microswitch S, which may be of any of the switch forms hereinbefore described, is mounted on a bracket means 340 secured by suitable means to the housing 10 of the microswitch. The microswitch S may be held to the bracket means 340 by the rivets 22 and 23 which secure the housing sections together. The bracket 340 is provided with a portion 342 terminating in a transversely extending or depending portion 344. The portion 342 of the bracket supports a sleeve 346 rigidly secured to the bracket and which is interiorly threaded to accommodate a threaded shaft 348 equipped with a manipulating knob 350.

The lower end of the shaft 348 is fashioned with a threaded opening to receive a member 352 having a flange or head portion 354. The depending portion 344 of the bracket is fashioned with a slot 356 to receive one end region of a thermoresponsive means 358 which, in the form illustrated, is an elongated member of bimetal of a conventional character which is flexed under the influence of ambient temperature variations. The bimetal element 358 is fashioned with an opening to accommodate the tenon or threaded member 352 and with a raised portion 360, the latter engaging the head or flange 354.

The opposite end of the bimetal element 358 is disposed to engage the plunger 78 of the microswitch S. An expansive coil spring 362 surrounds a lower portion of the shaft 348 and is disposed between the portion 342 of the bracket and the bimetal element 358, as shown in FIG. 32. Rotation of the threaded shaft 348 is transmitted through the flange 354 to the bimetal element 358 whereby the relative position of the bimetal element, as affecting the plunger 78, may be manually adjusted and controlled. The sleeve 346 is fashioned with an abutment member or portion 364 and the shaft 348 equipped with a stop member 366 cooperating with the abutment 364 to limit rotational movement of the shaft 348.

In the use of the arrangement shown in FIGS. 32 and 33 for controlling a heated environment, the bimetal element 358 is arranged to flex toward the microswitch S upon increase in the temeparature to depress the plunger 78 and actuate the switch mechanism in the housing 10 to interrupt a circuit.

The switch mechanism may be of any of the forms hereinbefore described. Where the switch mechanism shown in FIGS. 1, 17 or 24 is employed in the arrangement shown in FIGS. 32 and 33, the switch housing 10 is disposed on the bracket 340 in the relative position shown in FIG. 33.

Where the microswitch construction of the character illustrated in FIGS. 9 or 13 is employed in the manner shown in FIGS. 32 and 33, the microswitch is disposed on the bracket 340 so as to position the actuating plunger of the microswitch in engagement with the bimetal element 358. In this use of the microswitch construction, the contacts of the switch mechanism are interrupted by inward movement of the plunger 78 under the influence of the pressure exerted by flexure of the bimetal element 358.

Where the arrangement shown in FIG. 32 may be utilized in an air cooling environment, the bimetal element 358 may be inverted or reversed where the circuit through the microswitch controls an air cooling unit. In such installations the cooling unit is energized with the contacts in engaging relation and, upon a decrease in temperature, the inverted bimetal exerts pressure on the plunger 78 to disengage the contacts of the microswitch and de-energize the cooling unit.

FIGS. 34 and 35 illustrate a further combination of microswitch and thermoresponsive actuator and control therefor. In this arrangement, the thermoresponsive means comprises a fluid-filled chamber wherein fluid pressures act on a flexible diaphragm as a motion transmitting medium.

The housing 10 of the microswitch S is secured to an offset portion 374 of a bracket 376. The fluid-containing chamber is provided by an elongated tube 378 preferably fashioned of metal, the tube having its lower end closed by a cap 379, the upper portion having an enlarged threaded portion 380, the latter extending through an opening in the bracket 376.

Fashioned on the upper end of the tube is an enlarged hollow circular portion 382 terminating adjacent the bracket 376 in a shoulder 383 engaging the upper surface of the bracket 376. A securing nut 384 is received on the threaded portion 380 and drawn up to securely fasten the tube to the bracket. The hollow portion 382 provides a shallow chamber 386 of substantial area, the chamber being in communication with the chamber 387 provided by the tube 378. Disposed across the open end of the chamber 386 is a flexible diaphragm 390 preferably of metal, welded or otherwise sealingly secured to the peripheral region of the enlarged portion 382.

Thus, the chamber 387 and the shallow chamber 386 in communication therewith provide a closed vessel containing a gas or a suitable liquid which is affected by ambient temperature variations establishing varying pressures acting against the diaphragm 390. Welded or other wise secured to the bracket 376 is a sleeve 392 interiorly threaded to accommodate the threaded portion 393 of a rotatable shaft 394.

The shaft is equipped with a manipulating knob 396 and a collar or flange 398 integral with or securely fastened thereon. An elongated bar or lever 400 is provided for transmitting movement of the diaphragm 390 to actuate the plunger 78 of the microswitch S.

The lever 400 has a circular opening adjacent one end to accommodate the shaft 394 at a region below the collar 398. The lever 400 is fashioned with a raised portion 404 providing a linear apex region for engagement with the lower surface of the collar 398, as shown in FIG. 34. The region of the lever 400 adjacent the center of the diaphragm 390 is fashioned with a spherically-contoured raised portion 406 engaging the exterior surface of the diaphragm 390 whereby the lever 400 is moved by flexure of the diaphragm caused by varying pressures in the chamber 387 developed by varying ambient temperatures.

The lever 400 extends through a slot 407 in the bracket 376. The shaft 394 may be rotated to adjust the relative position of the lever 400 in respect of the plunger 78 whereby the lever actuates the plunger 78 by a predetermined fluid pressure developed in the chamber 387 at a temperature at which it is desired to interrupt a circuit through the switch S. Thus, by manipulating the knob 396 to rotate the shaft 394, control may be exercised to effect actuation of the plunger 78 of the switch by the lever 400 at a desired temperature.

FIGS. 36 and 37 illustrate a combination of microswitch with another form of thermoresponsive actuating means. A bracket 412 is fashioned with a portion 414 to which the microswitch S is secured by suitable means. The bracket 414 is provided with a first extending portion 416 fashioned with a hollow boss portion 417 which is interiorly threaded to receive the threaded portion 418 of a shaft 420. The shaft is equipped with a stop means 421 which cooperates with an abutment pin 422, the latter being pressed into an opening in the bracket portion 416. The shaft is provided with a manipulating knob 424.

The bracket 416 is fashioned with a second extending portion 426. Fixedly secured in an opening in an end region of the extension 426 is a tenon portion 428 fashioned on the end of a tube 430 fashioned of brass or other metal having a comparatively high coefficient of expansion. Slidably disposed within the tube 430 is a rod or bar 432 of Invar metal or other material having a comparatively low coefficient of expansion. The rod 422 extends above the upper end of the tube 430 and is fashioned with a head 434.

The rod 432 extends through an opening in an end region of a bar or lever 436, an expansive coil spring 438 surrounding the rod being disposed between the lever 436 and the upper tenon portion 428 of the tube 430. The head 434 engages the upper surface of the lever 436.

The lever 436 extends through an opening in a vertical portion of the bracket 426, the end region of the lever being disposed adjacent the actuating plunger 78 of the microswitch S. The shaft 420 is fashioned with a tenon portion 440 extending through an opening in the lever 436. A collar 442 is fixedly secured to the end of the tenon 440 by swaging 444.

The lever is fashioned with a raised portion 446 providing a linear apex region engaging the upper surface of the collar 442, as shown in FIG. 36. The lower end of the rod 432 extends beyond the adjacent end of the tube 430 and is threaded as at 448 to receive a nut 450. As the coefficient of expansion of the tube 430 is substantially greater than that of the Invar rod 432, an increase in ambient temperature effects a differential in expansion of the two metals causing the rod 432 to swing or move the lever in a clockwise direction as viewed in FIG. 36 about the apex of the raised portion 446 as a fulcrum or pivot axis.

This movement of the lever 436 depresses the plunger 78 of the microswitch S and effects a separation of the contacts in the switch to interrupt a circuit which may energize a heater providing the ambient temperature. When the ambient environment is decreased in temperature, the metal of the tube 430 contracts permitting the lever to be swung in a counterclockwise direction under the pressure of spring 438 about the apex of the raised portion 446 to release pressure on the plunger 78 of the microswitch and thus effect a reengagement of the switch contacts to complete a circuit through the switch.

The initial relationship of the lever 436 with respect to the collar 442 and the rod 432 may be adjusted by manipulating the nut 450 on the end of the rod. The relative position of the lever 436 with respect to the microswitch plunger 78 may be adjusted to provide for desired ambient temperatures by rotating the shaft 420.

It is to be understood that in the arrangements illustrated in FIGS. 32 through 37, the microswitch S may be of any of the forms of microswitch hereinbefore described. The microswitch of the invention may be utilized for controlling movements or operations of mechanical or other instrumentalities, or may be used as temperature control means as disclosed in FIGS. 32 through 37 and herein described.

It is apparent that, within the scope of the invention, modifications and different arrangements may be made other than as herein disclosed, and the present disclosure is illustrative merely, the invention comprehending all variations thereof.

I claim:

1. Switch mechanism of the character disclosed comprising, in combination, a housing fashioned of mating sections to provide a chamber, said housing sections being of molded resinous insulating material, a rivet adjacent each end region of the housing sections for securing the housing sections in assembled relation, switch means in said chamber including first and second terminal members having terminal connector portions extending exteriorly of the housing, the terminal members being anchored by adjacent portions of the housing sections, a flexible switch arm in said chamber having one end anchored by one rivet in engagement with the first terminal member, said switch arm having a contact mounted at its distal end, said second terminal member having a loop portion of substantial length terminating in a distal end, a contact carried thereby being disposed at the distal end of the loop portion for cooperation with the contact on the switch arm, said loop portion providing an inmpact-absorbing mounting for the said contact, a spring having a planar portion of an integral arcuately-shaped portion, the end region of the planar portion being anchored by the second rivet, said arcuately-shaped portion adjacent its juncture with the planar portion having a slot therein forming hinge regions for the curved portion, the distal end of the curved portion having a slot, said switch arm having a portion engaging in the slot, a plunger movable in an opeing in a housing section and having a portion engaging the planar portion of the spring member adjacent the curved portion, said spring member normally biasing the switch arm into contact-engaging position, said plunger being movable inwardly of the housing for flexing the spring member to effect opening movement of the switch arm by snap action to disengage the contacts, said spring member being moved by stress set up therein upon release of pressure on said plunger whereby the spring member returns the switch arm to contact-engaging position.

2. The combination according to claim 1 including abutment means limiting the extent of movement of the switch arm in contact-disengaging position.

References Cited

UNITED STATES PATENTS

| | | | |
|---|---|---|---|
| 3,291,931 | 12/1966 | Rogers. | |
| 2,929,901 | 3/1960 | Bloch | 200—153.19 |
| 2,896,041 | 7/1959 | Schwaneke | 200—73 |
| 3,306,998 | 2/1967 | Russell. | |
| 3,210,497 | 10/1965 | Schwartz | 337—318 XR |
| 3,004,124 | 10/1961 | Huffman | 337—347 |
| 2,927,171 | 3/1960 | Rhodes. | |
| 3,223,806 | 12/1965 | Moro | 337—373 |

FOREIGN PATENTS

| | | |
|---|---|---|
| 1,052,056 | 1/1954 | France. |
| 326,752 | 12/1957 | Switzerland. |

BERNARD A. GILHEANY, Primary Examiner

D. M. MORGAN, Assistant Examiner

U.S. Cl. X.R.

200—153, 166; 337—318, 334, 365